United States Patent
Chhabra et al.

(10) Patent No.: US 9,398,519 B2
(45) Date of Patent: Jul. 19, 2016

(54) BEACON FRAME MONITORING

(75) Inventors: Kapil Chhabra, Miplitas, CA (US); Tito Thomas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 343 days.

(21) Appl. No.: 13/539,237

(22) Filed: Jun. 29, 2012

(65) Prior Publication Data

US 2013/0343198 A1 Dec. 26, 2013

Related U.S. Application Data (60) Provisional application No. 61/663,509, filed on Jun. 22, 2012.

(51) Int. Cl.
*H04W 48/12* (2009.01)
(52) U.S. Cl.
CPC ..................................... *H04W 48/12* (2013.01)
(58) Field of Classification Search
USPC ......... 370/242, 254, 310, 311, 312, 328, 338, 370/241
See application file for complete search history.

(56) References Cited

U.S. PATENT DOCUMENTS

| | | | |
|---|---|---|---|
| 7,768,960 B1* | 8/2010 | Barratt | H04W 48/16 370/328 |
| 8,005,032 B2 | 8/2011 | Wang et al. | |
| 8,005,515 B1* | 8/2011 | Chhabra | H04W 52/0229 455/127.5 |
| 8,170,002 B2 | 5/2012 | Wentink | |
| 2002/0114303 A1* | 8/2002 | Crosbie et al. | 370/338 |
| 2005/0009578 A1* | 1/2005 | Liu | H04W 52/0232 455/574 |
| 2005/0068928 A1* | 3/2005 | Smith | H04W 48/16 370/338 |
| 2006/0009246 A1* | 1/2006 | Marinier | H04W 24/00 455/502 |
| 2006/0089964 A1* | 4/2006 | Pandey et al. | 709/203 |
| 2007/0014269 A1* | 1/2007 | Sherman et al. | 370/338 |
| 2007/0050523 A1* | 3/2007 | Emeott | H04W 56/001 709/248 |
| 2010/0091657 A1* | 4/2010 | Tsfaty | H04W 52/0296 370/241 |
| 2012/0044924 A1* | 2/2012 | Ji et al. | 370/338 |
| 2012/0063340 A1* | 3/2012 | Waters et al. | 370/252 |
| 2013/0003626 A1* | 1/2013 | Husted et al. | 370/311 |
| 2013/0077546 A1* | 3/2013 | Liu et al. | 370/311 |
| 2013/0223419 A1* | 8/2013 | Ghosh et al. | 370/338 |

FOREIGN PATENT DOCUMENTS

| | | |
|---|---|---|
| EP | 1903720 | 3/2008 |
| EP | 1903720 A1 * | 3/2008 |
| WO | 2011098141 | 8/2011 |

* cited by examiner

*Primary Examiner* — Hanh N Nguyen
*Assistant Examiner* — Jose Perez
(74) *Attorney, Agent, or Firm* — Meyertons, Hood, Kivlin, Kowert & Goetzel, P.C.

(57) ABSTRACT

Techniques are disclosed relating to reception of beacon frames. In one embodiment, an apparatus is disclosed that includes a radio circuit. The radio circuit is configured to determine an estimated time period during which the radio circuit will receive a next beacon frame from a wireless access point associated with a wireless channel. The estimated time period is determined relative to a clock of the radio circuit. The radio circuit is further configured to begin monitoring the wireless channel for the next beacon frame during the estimated time period.

13 Claims, 7 Drawing Sheets

BEACON FRAME MONITORING

This application claims the benefit of U.S. Provisional Application No. 61/663,509 filed on Jun. 22, 2012, which is incorporated by reference herein in its entirety.

BACKGROUND

1. Technical Field

This disclosure relates generally to wireless communication, and, more specifically, to reception of beacon frames.

2. Description of the Related Art

Modern mobile devices typically include support for one or more wireless protocols that permit the devices to connect to various networks. In many instances, such devices connect to a network via a wireless access point that facilitates communication between the wireless device and wired components of a network (or, in some instances, other wireless devices).

A wireless access point may periodically broadcast information that advertises its existence to potential wireless devices interested in connecting to it. This information may also include various parameters usable to negotiate a connection with the access point such as supported transmission rates, encryption protocols, etc. In some instances, this information may be supplied within a frame called a beacon frame.

SUMMARY

The present disclosure relates to wireless devices that receive beacon frames. In one embodiment, a wireless device is disclosed that is configured to determine an estimated time period during which it will receive the next beacon frame broadcasted from a wireless access point associated with a wireless channel. The device then begins monitoring the wireless channel for the next beacon frame during the estimated time period. By waiting to monitor the wireless channel for a beacon frame, the wireless device may be permitted to perform other operations in the meantime such communicating with other access points, entering a low power, etc.

In various embodiments, the estimated time period is determined relative to a local time value maintained by a clock of the wireless device (as opposed to a time value maintained by a clock of the wireless access point). The estimated time period may be further determined based on a timestamp and beacon interval specified in a pervious frame. In one embodiment, this frame is a probe response received in response to submitting a probe request to the access point. However, the wireless device may alternatively monitor a wireless channel for an access point's periodic broadcast of beacon frames.

In one embodiment, an access point is disclosed that is configured to provide timing information associated with other access points (e.g., neighboring access points) to a wireless device. The wireless device may then use this information to determine when other ones of the access points are expected to broadcast beacon frames.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising a radio circuit . . . . " Such a claim does not foreclose the apparatus from including additional components (e.g., a central processing unit, graphics circuitry, peripherals, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Computer readable medium." As used herein, this term refers to an article of manufacture and may include any non-transitory/tangible storage media readable by a device to provide instructions and/or data to the device. For example, a computer readable storage medium may include storage media such as magnetic or optical media, e.g., disk (fixed or removable), tape, CD-ROM, DVD, etc. Storage media may further include volatile or non-volatile memory media such as RAM, ROM, Flash memory, etc.

DETAILED DESCRIPTION

Figure 1:
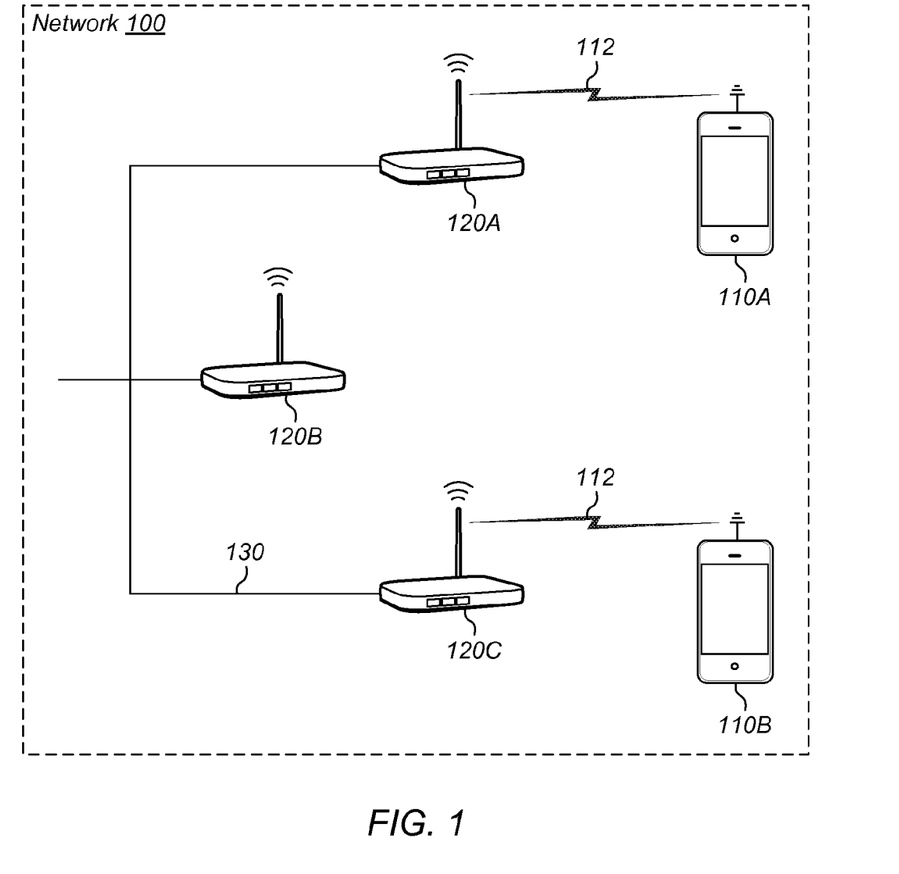
FIG. 1 is a block diagram illustrating one embodiment of a network supporting wireless communication.

Turning now to FIG. 1, a block diagram of a network 100 is depicted. Network 100 is one embodiment of a network that is configured to support wireless communication between network components. In the illustrated embodiment, network 100 includes wireless devices 110A and 110B, wireless access points 120A-C, and a wired network 130.

Wireless devices 110 may be any type of suitable device. Devices 100 may, for example, include desktop personal computers, laptops, workstations, net tops, mobile phones, personal data assistants, tablet devices, music players, I/O devices such as monitors, televisions, touch screens, digital cameras, scanners, video recorders, video players, etc. In some embodiments, wireless devices 110 are configured to implement one or more of the IEEE 802.11 standards (such as 802.11a, b, g, n, k, and ac) in order to establish a wireless connection 112 with an access point 120. In some embodiments, wireless devices may support other wireless standards such as IEEE 802.15 standards (e.g., Bluetooth, ZigBee, etc.), cellular standards (e.g., Universal Mobile Telecommunications System (UMTS), Evolution-Data Optimized (EV-DO), Long Term Evolution (LTE), etc.), etc.

Access points 120, in one embodiment, are configured to facilitate communication between wireless devices 110 and wired network 130. Accordingly, access points 120 may be configured to communicate over one or more wireless channels corresponding to different respective frequencies (e.g., channels associated with 2.4 GHz and 5 GHz bands. Access points 120 may also support multiple transmission rates, various encryption standards, frequency hopping, etc. In some embodiments, access points 120 are members of the same extended service set (ESS); in one embodiment, access points 120 are associated with the same service set identifier (SSID). Although, in the illustrated embodiment, access points 120 are shown as being coupled to the same wired network 130, in some embodiments, access points 120 may be associated with separate unrelated networks.

Wired network 130 may correspond to any suitable wired network. Accordingly, in one embodiment, network 130 is a local area network (LAN). Network 130 may include switches, routers, or other wired devices. In some embodiments, network 130 may include one or more gateways to facilitate communication with a wide area network (WAN) such as the Internet.

In various embodiments, access points 120 are configured to transmit beacon frames to wireless devices 110 to facilitate communication with devices. Access points 120 may transmit beacon frames as part of a periodic broadcast such as transmitting a beacon frame every 100 ms. A wireless device 110 may thus receive the beacon frame by monitoring the wireless channel that the beacon frame is transmitted over. Access points 120 may also transmit a probe response (which is a frame that has a similar layout as a beacon frame and specifies similar information such as a beacon interval and a timestamp discussed below) in response to receiving a probe request from a given wireless 110. For example, wireless device 110A may send a probe request to access point 120A to request a probe response from that access point 120; wireless device 110A may then monitor the wireless channel associated with access point 120A for the probe response.

As will be discussed with respect to FIG. 2, a beacon frame may include various information usable by devices 110 such as prosperities of the access point 120, a timestamp indicative of the current time at the access point 120 when the beacon frame was transmitted, a beacon interval indicative of how frequently the access point 120 will broadcast beacon frames, etc. In one embodiment, access points 120 transmit beacon frames (as well as probe responses) in accordance with one or more IEEE 802.11 standards. Wireless devices 110 may use beacon frames to negotiate and establish a connection 112. In some embodiments, wireless devices 110 use beacon frames to facilitate roaming—e.g., a wireless device 110 may transition from one access point 120 to another access point 120 based on signals strengths of beacon frames, supported transmission rates specified in beacon frames, utilization of a given access point 120 as indicated in beacon frames, etc. In some embodiments, wireless devices 110 are further configured to use beacon frames to facilitate positioning of devices 110 within an area—e.g., a device 110 having a knowledge of where access points 120 are located may be configured to determine its location based on received signal strength indicators (RSSI) for beacon frames received from access points 120.

In various embodiments, wireless devices 110 are configured to determine an estimated time period during which devices 110 will receive a next beacon frame from a wireless access point 120, and to begin monitoring for the next beacon frame during the estimated time period. In one embodiment, the estimated time period is determined based on a timestamp and a beacon interval specified in either a probe response or a previously beacon frame according to the following formula.

$$TBTT_N = (t_{local} - t_{beacon} \bmod BI) + N \times BI$$

In this formula, the target beacon transmission time (TBTT) refers the estimated time period; $t_{local}$ refers the local time value at a device 110; $t_{beacon}$ refers to the specified timestamp (corresponding to a local time value at the access point 120); BI refers to the specified beacon interval; and N is a positive integer representative of a next beacon frame (accordingly, to determine a respective estimated time period for a series of beacon frames, N may be 1 for an initial next beacon frame, 2 for the next beacon frame after the initial beacon frame, and so on). In such an embodiment, the estimated time period is determined relative to a clock of the wireless device 110. That is, a wireless device 110 and an access point 120 may each include a respective clock that maintains a local time value (such as clocks 352 and 532 discussed with respect to FIGS. 3 and 5, respectively). In some instances, the local time values maintained by these clocks may differ from one another. In such an embodiment, the estimated time period corresponds to a future time value of device 110's clock at which a beacon frame is expected to be received at the device 110. Determining the estimated time period in this manner stands in contrast to, for example, determining the estimated time period relative to the clock at the access point 120 as well as synchronizing the clock at the wireless device 110 with the clock at the access point 120 by replacing the time value of device 110's clock with the time value of a timestamp specified by a probe response or a beacon frame indicative the local time value at the access point 120.

By determining estimated time periods relative to a local clock of the wireless device 110 in some embodiments, the wireless device 110 is able to maintain an active connection with an access point 120 while determining estimated time periods for beacon frames of other access points 120, which may have different local times from one another and may broadcast beacon frames at different time periods and at different beacon intervals. For example, in one embodiment, upon establishing a wireless connection 112 with access point 120A, wireless device 110A may synchronize its clock with access point 120A's clock (e.g., using the timing synchronization function (TSF) specified by IEEE 802.11). Wireless device 110A may then determine estimated time periods for beacon frames from access points 120B and 120C, and may monitor for those beacon frames without synchronizing its clock with the clocks of those access points 120.

In some embodiments, an access point 120 may be configured to assist wireless devices 110 in determining estimated time periods by providing devices 110 with timing information about other access points 120. In one embodiment, this timing information may specify the local time values and beacon intervals of those access points 120. In another embodiment, this timing information may specify offset values indicative of a difference between that local time value at that access point 120 and the local time values of other access points 120. Accordingly, access point 120A may indicate, to wireless device 110A, the offset between its clock and the clocks of neighboring access points 120B and 120C. If the clocks of access points 120A and 120B differ by some amount (e.g., 5 ms) and device 110A has already determined an estimated time period for a next beacon frame from access point 120A, device 110A can then determine an estimated time period for a next beacon frame from access point 120B based on this offset (and without receiving a probe request or an initial beacon frame from access point 120B). In one embodiment, timing information may be transmitted as part of a beacon frame; in another embodiment, this timing information may be transmitted in one or more frames independently of beacon frames. In some embodiments, timing information may also be provided by other devices in network 100 such as other wireless devices 110.

In various embodiments, once a wireless device 110 has determined an estimated time period for an access point 120, the wireless device 110 is configured to begin monitoring a wireless channel within a window that starts before the estimated time period and continues after the estimated time period. For example, in one embodiment, a wireless device 110 may begin monitoring a channel 3 ms before the estimated time period and to continue monitoring for 3 ms after that period. If a beacon frame is detected, the device 110 may continue to monitor for the duration of the beacon frame transmission. On the other hand, if a beacon frame is not detected (e.g., after one or more failed attempts), in one embodiment, device 110 submits a probe request to receive a probe response and determines new estimated time period. In some embodiments, while a wireless device 110 is waiting to monitor a wireless channel for a beacon frame, the wireless device 110 may perform various other operations such as communicating with another access point 120 or entering a low power state (a state in which it consumes less power than when monitoring a wireless channel).

Wireless devices 110 and access points 120 are discussed in further detail below with respect to FIGS. 3 and 5.

Figure 2:
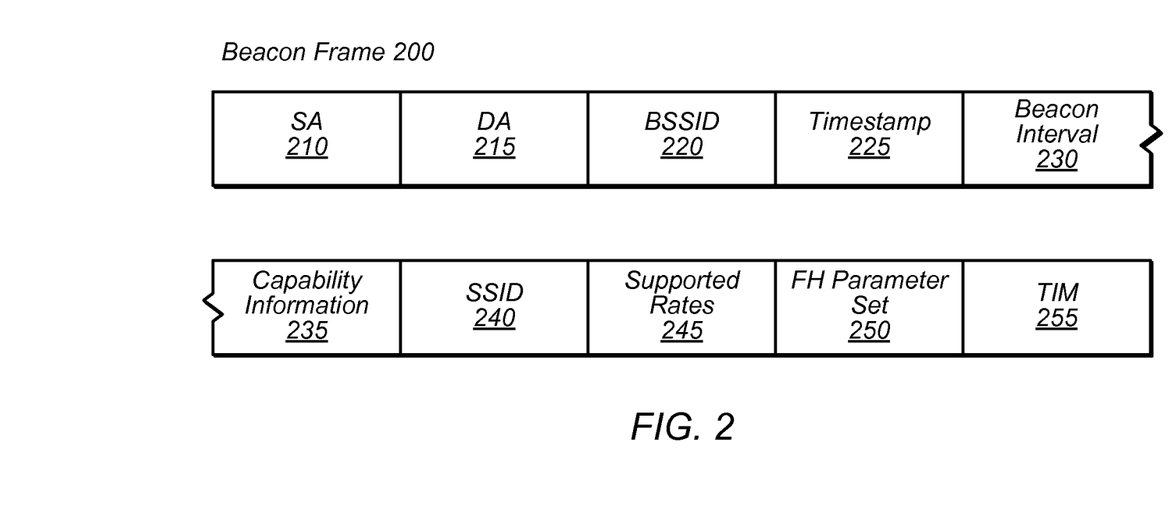
FIG. 2 is a block diagram illustrating one embodiment of a beacon frame.

Turning now to FIG. 2, a block diagram of an exemplary beacon frame 200 is depicted. In the illustrated embodiment, beacon frame 200 includes a source address (SA) 210, destination address (DA) 215, basic service set identifier (BSSID) 220, timestamp 225, beacon interval 230, capability information 235, service set identifier (SSID) 240, supported rates 245, frequency hopping (FH) parameter set 250, and traffic indication map (TIM) 255. In some embodiments, beacon frame 200 may include more (or less) information than shown. (It is noted that probe responses may have a similar layout as beacon frame 200; however, a probe response may have a different destination address 215 as discussed below).

Source address 210, in one embodiment, is the address of the access point 120 that is sending beacon frame 200 (or probe response). In IEEE 802.11, address 210 is a media access control (MAC) address of the access point 120.

Destination address 215, in one embodiment, is an address of an intended recipient or recipients. In the case of a beacon frame broadcast, address 215 may be a broadcast address monitored by multiple wireless devices 110. In the case of a probe response, address 215 may be the address of the device 110 that sent the probe request.

BSSID 220, in one embodiment, is an identifier indicative of the basic service set with which the access point 120 is associated. In some instances, BSSID 220 is the same as source address 210.

Timestamp 225, in one embodiment, is a time value indicative of the current local time at an access point 120 when beacon frame 200 was transmitted. In 802.11, timestamp 225 is a 64-bit value that is initialized to zero and incremented once every microsecond.

Beacon interval 230, in one embodiment, is value indicative of how frequently a beacon frame 200 will be broadcast from an access point 120. For example, a beacon interval 230 may specify a value of 100 ms between beacon frame transmissions.

Capability information 235, in one embodiment, specifies various information about an access point 120 such as whether the access point is associated with ad-hoc infrastructure, supports encryption, supports usage of short preambles, etc.

SSID 240, in one embodiment, is a character identifier indicative of the wireless network being hosted by the access point 120. SSID 240 may, for example, correspond to the name of a wireless network displayed on wireless device 110 to a user.

Supported rates 245, in one embodiment, specify the supported transmission rates of an access point 120. For example, rates 245 may specify that an access point 120 supports transmissions rates at 11, 36, and 54 Mbit/s.

FH parameter set 250, in one embodiment, specifies information usable to facilitate frequency hopping. This information may include, for example, a dwell time for staying on a particular channel, an indication of the hop pattern, an index identifying the current point in the hop pattern.

TIM 255, in one embodiment, specifies information usable to by wireless devices 110 operating in a low power mode to determine whether an access point 120 has buffered frames for them while they were operating in the low power mode.

Figure 3:
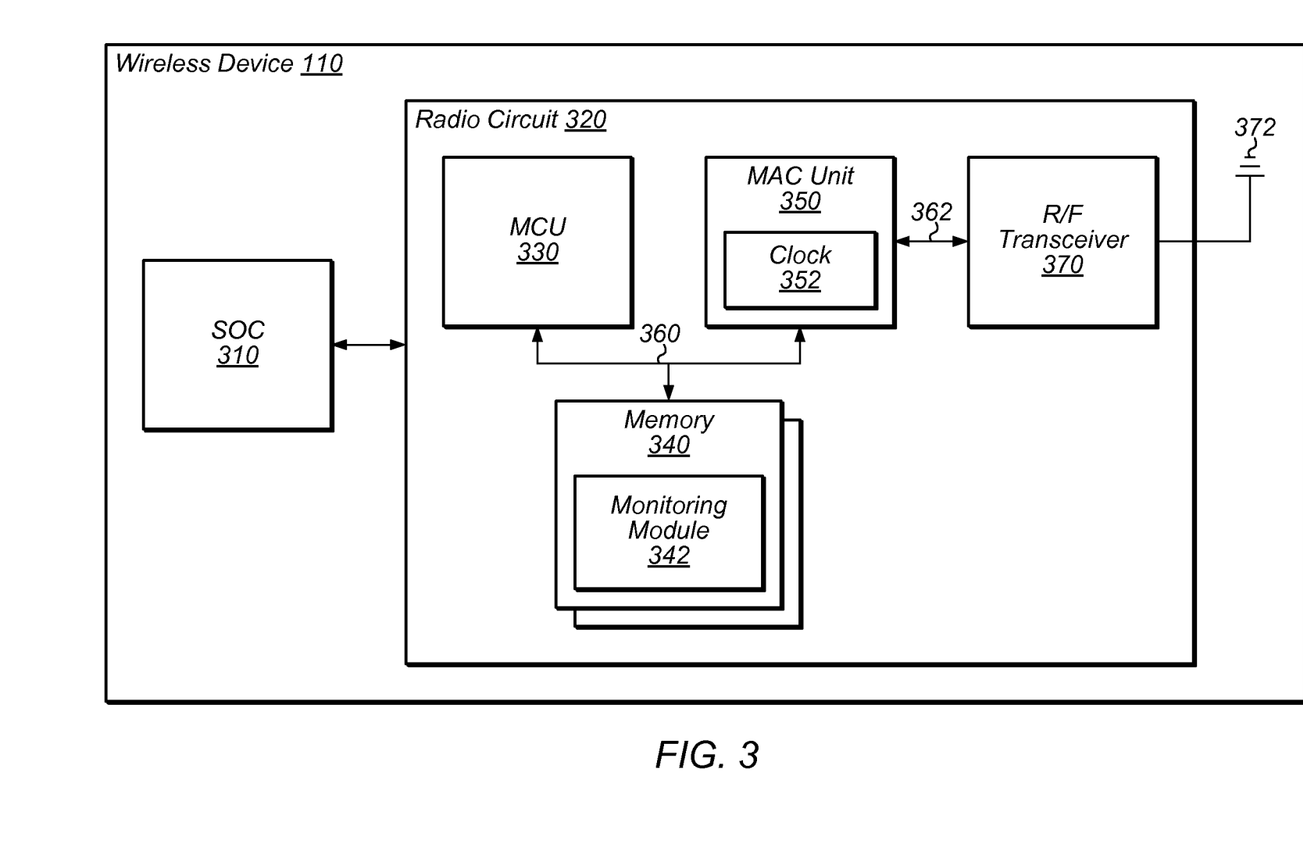
FIG. 3 is a block diagram illustrating one embodiment of a wireless device.

Turning now to FIG. 3, a block diagram of a wireless device 110 is depicted. In the illustrated embodiment, wireless device 110 includes a system on a chip (SOC) 310 and a radio circuit 320. Radio circuit 320, in turn, includes a microcontroller unit (MCU) 330, memory 340, MAC unit 350, interconnects 360 and 362, and an R/F transceiver 370. In some embodiments, device 110 may be configured differently than shown—e.g., device 110 may include a processor and memory rather than SOC 310; radio circuit 320 may include dedicated logic rather than monitoring module 342 discussed below.

SOC 310, in one embodiment, is configured manage operation of wireless device 110. SOC 310 may include a central processor unit (CPU) and memory storing various applications executable by the CPU (one embodiment of SOC 310 is discussed below with respect to FIG. 7). SOC 310 may generate data being transmitted from wireless device 110 as well as operate on data received at wireless device 110.

Radio circuit 320, in one embodiment, is configured to coordinate wireless communication for wireless device 110. In the illustrated embodiment, MCU 330 executes program instructions stored in memory 340 (such as monitoring module 342) to manage operation of radio circuit 320. In one embodiment, MAC unit 350 facilitates frame assembly and disassembly for transceiver 370. Transceiver 370, in turn, may generate RF signals for outbound frames transmitted via antenna 372 and process RF signals for inbound frames received via antenna 372.

Monitoring module 342, in one embodiment, includes program instructions executable to cause radio circuit to monitor for beacon frames. Accordingly, module 342 may include instructions executable to determine estimated time periods for when beacon frames will be received and to cause radio circuit to monitor particular wireless channels for beacon frames during those time periods such as described above. In some embodiments, a processor other than MCU 330 (such as a processor within SOC 310) may execute monitoring module 342; functionality of module 342 may also be implemented in hardware.

Clock 352, in one embodiment, is configured to maintain a local time value for wireless device 110. Accordingly, clock 352 may store a value that is updated periodically to reflect the current time. In some embodiments, clock 352 maintains a 64-bit value that is incremented every microsecond (e.g., in accordance with IEEE 802.11); however, in other embodiments, clock 352 may maintain a different size value that is updated at a different rate. In one embodiment, MAC unit 350 appends the current local time value maintained by clock 352 to received beacon frames to indicate when those frames were received at radio circuit 320. In one embodiment, monitoring module 342 uses this local time value along with a timestamp and a beacon interval to determine an estimated time period for receiving a next beacon frame (accordingly, the time value of clock 352 may correspond to $t_{local}$ in the formula discussed above). In some embodiments, clock 352 may be located independently of MAC unit 350 (and even externally to radio circuit 320).

Figure 4:
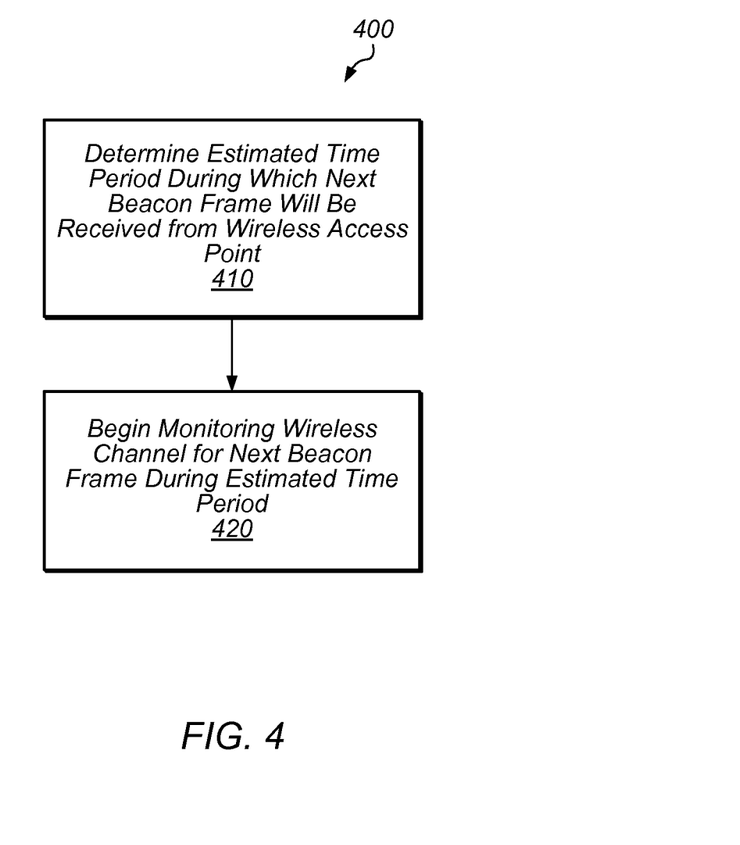
FIG. 4 is a flow diagram illustrating one embodiment of a method for receiving beacon frames.

Turning now to FIG. 4, a flow diagram of a method 400 for receiving beacon frames is depicted. Method 400 is one embodiment of method that may be performed by a device including a radio circuit such as one of wireless devices 110. In some embodiments, performance of method 400 may reduce power consumption of the radio and/or reduce the amount of wireless traffic within a given area.

In step 410, an estimated time period during which a radio circuit (e.g., radio circuit 320) will receive a next beacon frame from a wireless access point associated with a wireless channel is determined. In various embodiments, the estimated time period is determined relative to a clock (e.g., clock 352) of the radio circuit. As discussed above, the estimated time period may be determined based on a timestamp (e.g., timestamp 255) and a beacon interval (e.g., beacon interval 230) specified in an initial frame (i.e., a beacon frame or a probe response). Accordingly, in one embodiment, step 410 includes performing a modulo operation with the timestamp as a dividend and the beacon interval as a divisor, subtracting a result of the modulo operation from the current time value, and adding a multiple of the beacon interval to a result of the subtracting, where the estimated time period is a result of the adding (such as discussed with the formula above). In various embodiments, step 410 is performed without adjusting the local time based on the timestamp in a received beacon frame or probe response.

In step 420, a wireless channel is monitored for the next beacon frame during the estimated time period. In one embodiment, while the radio circuit is waiting to monitor the wireless channel for the next beacon, the radio circuit may enter a low power state. The radio circuit may alternatively maintain a connection with an access point other than the one transmitting the beacon frame. As discussed above, in various embodiments, the radio circuit may begin monitoring for the beacon frame prior to the estimated time period—e.g., within three milliseconds of the estimated time period, in one embodiment. In some instances, step 420 may include detecting a failure to receive one of the additional beacon frames. In various embodiments, step 410 may be performed again responsive to such a detection. Accordingly, in response to detecting the failure, the radio circuit may send a probe request to the wireless access point to receive a probe response and determine another estimated time period based on the probe response.

Figure 5:
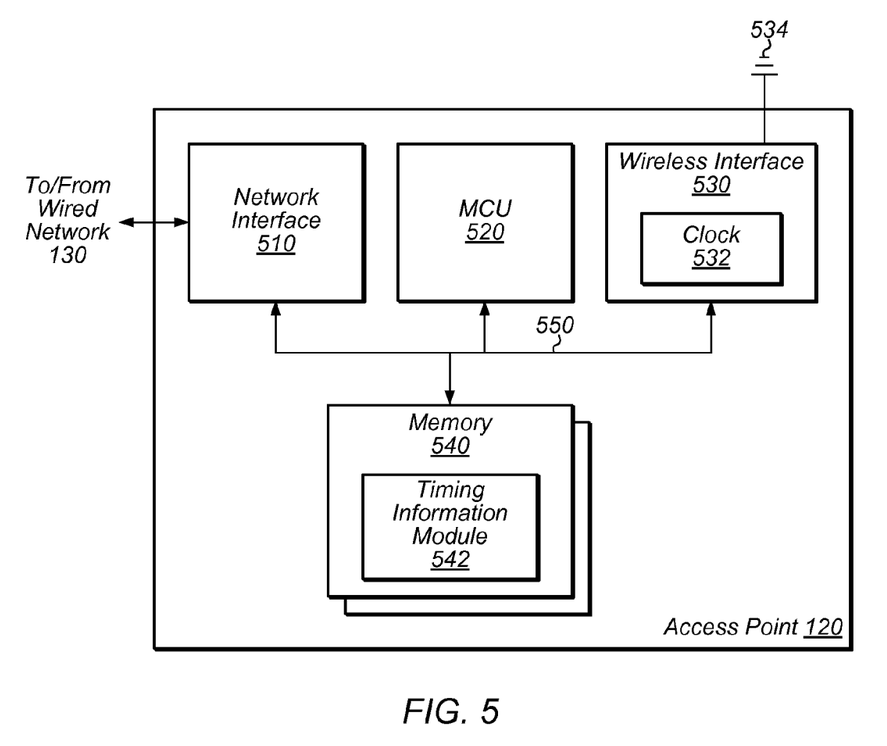
FIG. 5 is a block diagram illustrating one embodiment of an access point.

Turning now to FIG. 5, a block diagram of an access point 120 is depicted. In the illustrated embodiment, access point 120 includes a network interface 510 configured to interface access point 120 with wired network 130, an MCU 520 configured to manage operation of access point, a wireless interface 530 configured to communicate with wireless devices 110 via an antenna 534, memory 540, and an interconnect 550. Wireless interface 530 further includes a clock 532 (in other embodiments, clock 532 may be located elsewhere).

Clock 532, in one embodiment, is configured to maintain a local time value for access point 120. In various embodiments, clock 532 is used to generate the timestamp included beacon frames and probe responses transmitted by access point 120. Clock 532 may be implemented in a similar manner as clock 352 discussed above with respect to FIG. 3.

As discussed above, in some embodiments, access point 120 is configured to provide timing information about other access points 120 to wireless devices 110. In the illustrated embodiment, MCU 520 executes program instructions of timing information module 542 to facilitate providing this information. Accordingly, module 542 may be executable to cause the access point 120 to receive time values from clocks 532 located in other access points 120 and to communicate, via the wireless interface 530, timing information corresponding to the time values. In one embodiment, access point 120 receives timing values from other access points 120 via network interface 510. Alternatively, access point 120 may also receive time values via wireless interface 530. In one embodiment, the communicated timing information specifies these received time values. In another embodiment, module 542 is executable to determine, for each of the time values, a respective offset value indicative of a difference between that time value and the local time value of clock 352. The timing information may then specify these determined offset values. In some embodiments, access point 120 may communicate timing information within a beacon frame or a probe response. In other embodiments, the timing information may be communicated within one or more frames transmitted independently of beacon frames—accordingly, in one embodiment, such frames may be communicated less frequently than the periodic broadcast of beacon frames.

Figure 6:
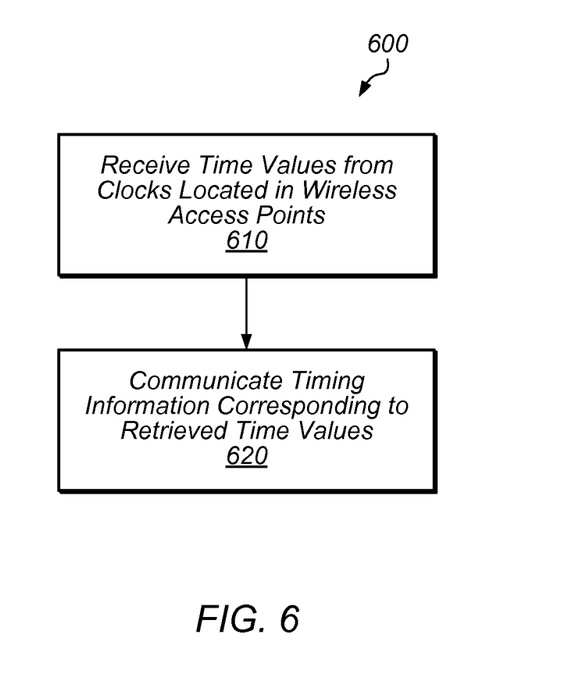
FIG. 6 is a flow diagram illustrating one embodiment of a method for providing timing information associated with neighboring access points.

Turning now to FIG. 6, a flow diagram of a method 600 for providing timing information associated with neighboring access points is depicted. In one embodiment, method 600 is performed by an access point such as access points 120. In another embodiment, method 600 may be performed by another wireless device such as devices 110. Method 600 begins, in step 610, with receiving time values from clocks located in different wireless access points such as described above. Method 600 continues, in step 620, with communicating, to a wireless device via a wireless interface, timing information corresponding to the time values such as described above.

In response to receiving the information communicated in step 620, a wireless device may perform a corresponding method based on the received information. In one embodiment, such a method may include receiving, from a first wireless access point, timing information indicative of a local time value for a second wireless access point. The method may further include determining, based on the timing information, an estimated time period during which the device will receive a next beacon frame from the second wireless access point.

Figure 7:
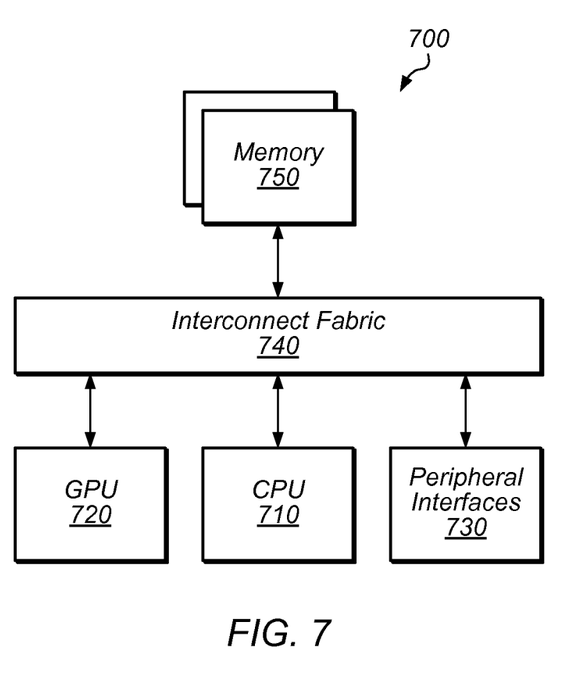
FIG. 7 is a block diagram illustrating one embodiment of an exemplary system on a chip.

Turning now to FIG. 7, a block diagram of an exemplary SOC 700 is depicted. SOC 700 is one embodiment of an SOC (which may correspond to SOC 310 described above). In the illustrated embodiment, SOC 700 includes a central processor unit (CPU) 710, graphics processing unit (GPU) 720, peripheral interfaces 730, interconnect fabric 740, and memory 750.

CPU 710 may implement any instruction set architecture, and may be configured to execute instructions defined in that instruction set architecture. CPU 710 may employ any microarchitecture, including scalar, superscalar, pipelined, superpipelined, out of order, in order, speculative, non-speculative, etc., or combinations thereof. CPU 710 may include circuitry to implement microcoding techniques. CPU 710 may include one or more processing cores each configured to execute instructions. CPU 710 may include one or more levels of caches, which may employ any size and any configuration (set associative, direct mapped, etc.). In some embodiments, CPU 710 may execute instructions that facilitate performance of operation of wireless device 110 described above.

GPU 720 may include any suitable graphics processing circuitry. Generally, GPU 720 may be configured to render objects to be displayed into a frame buffer. GPU 1020 may include one or more graphics processors that may execute graphics software to perform a part or all of the graphics operation, and/or hardware acceleration of certain graphics operations. The amount of hardware acceleration and software implementation may vary from embodiment to embodiment.

Peripherals interfaces 730 may used to interface with various peripherals devices located within SOC 700 or external to SOC 700. These devices may include any desired circuitry, depending on the type of system including SOC 700. For example, in one embodiment, the peripheral devices may include devices for various types of wireless communication, such as WiFi, Bluetooth, cellular, global positioning system, etc. Peripheral devices may also include additional storage, including RAM storage, solid-state storage, or disk storage. Peripherals devices may include user interface devices such as a display screen, including touch display screens or multitouch display screens, keyboard or other input devices, microphones, speakers, cameras, scanners, printing devices, etc.

Interconnect fabric 740, in one embodiment, is configured to facilitate communications between units 710-750. Interconnect fabric 740 may include any suitable interconnect circuitry such as meshes, network on a chip fabrics, shared buses, point-to-point interconnects, etc.

Memory 750 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. In some embodiments, the modules may be mounted in a chip-on-chip configuration, a package-on-package configuration, or a multi-chip module configuration.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A device, comprising:
   a radio circuit configured to:
   receive an initial frame specifying a beacon interval and a timestamp corresponding to a clock of a first wireless access point, wherein the clock of the first wireless access point has a different local time than a clock of a second wireless access point;
   determine an estimated time period during which the radio circuit will receive a next beacon frame from the first wireless access point associated with a wireless channel, wherein the radio circuit is configured to determine the estimated time period by:
   performing a modulo operation with the timestamp as a dividend and the beacon interval as a divisor;
   subtracting a result of the modulo operation from a value of a local clock of the radio circuit; and
   adding a multiple of the beacon interval to a result of the subtracting to determine the estimated time period;
   wherein the radio circuit is further configured to determine the estimated time period while the value of the local clock is synchronized with the clock of the second wireless access point, and wherein the radio circuit is configured to further determine the estimated time period without synchronizing the value of the local clock with the timestamp; and
   begin monitoring the wireless channel for the next beacon frame during the estimated time period.

2. The device of claim 1, wherein the radio circuit is further configured to send a probe request to the first wireless access point to initiate transmission of the initial frame.

3. The device of claim 1, wherein the radio circuit is further configured to:
   monitor, based on the estimated time period, the wireless channel for additional beacon frames broadcasted periodically by the first wireless access point;
   detect a failure to receive one of the additional beacon frames;
   in response to detecting the failure, send a probe request to the first wireless access point to receive a probe response; and
   determine another estimated time period based on the probe response.

4. The device of claim 1, wherein the radio circuit is further configured to enter and exit a low power state before beginning the monitoring of the wireless channel for the next beacon frame.

5. A non-transitory computer readable medium having program instructions stored thereon, wherein the program instructions are executable by a device to cause the device to perform operations comprising:

receiving an initial frame over a wireless channel from a wireless access point, wherein the initial frame includes a timestamp of the wireless access point and a beacon interval;

determining an estimated time period during which the device will receive a beacon frame from the wireless access point, wherein the estimated time period is determined based on the timestamp, the beacon interval, and a current time value for a clock of the device, wherein determining the estimated time period includes:

performing a modulo operation with the timestamp as a dividend and the beacon interval as a divisor;

subtracting a result of the modulo operation from the current time value; and adding a multiple of the beacon interval to a result of the subtracting, wherein the estimated time period is a result of the adding.

6. The computer readable medium of claim 5, wherein the operations further comprise:

beginning monitoring for the beacon frame within three milliseconds of the estimated time period.

7. The computer readable medium of claim 5, wherein receiving the initial frame includes submitting a probe request to the wireless access point to cause transmission of a probe response, and wherein the probe response is the initial frame.

8. The computer readable medium of claim 5, wherein receiving the initial frame includes monitoring the wireless channel for a periodic broadcast of a beacon frame by the wireless access point.

9. A device, comprising:

a clock configured to maintain a local time value;

a radio circuit configured to:

determine an estimated time period during which the radio circuit will receive a next beacon frame from a first wireless access point associated with a wireless channel, wherein the radio circuit is further configured to determine the estimated time period based on the local time value, a timestamp specified in a frame from the first wireless access point, and a beacon interval specified in the frame by:

performing a modulo operation with the timestamp as a dividend and the beacon interval as a divisor;

subtracting a result of the modulo operation from the local time value; and adding a multiple of the beacon interval to a result of the subtracting to determine the estimated time period;

wherein the radio circuit is configured to further determine the estimated time period while the local time value is synchronized with a clock of a second wireless access point that has a different local time than a clock of the first wireless access point; and wait until the estimated time period to monitor the wireless channel for the next beacon frame.

10. The device of claim 9, wherein the frame is a previous beacon frame specifying a timestamp of the first wireless access point and a beacon interval.

11. The device of claim 9, wherein the radio circuit is further configured to determine, for each of a plurality of wireless access points, a respective estimated time period during which the radio circuit will receive a next beacon frame from each wireless access point.

12. The device of claim 11, wherein the radio circuit is further configured to:

receive, from a first of the plurality of wireless access points, timing information indicative of local time values of clocks associated with other ones of the wireless access points; and determine an estimated time period for a second wireless access point based on the received timing information, wherein the estimated time period for the second wireless access point is an estimated time period during which the radio circuit will receive a next beacon frame from the second wireless access point.

13. The device of claim 9, wherein the radio circuit is further configured to:

communicate with another wireless access point while waiting until the estimated time period; and resume communication with the other wireless access point after monitoring the wireless channel for the next beacon frame.

* * * * *